US005315827A

United States Patent [19]

Imai et al.

[11] Patent Number: 5,315,827

[45] Date of Patent: May 31, 1994

[54] APPARATUS FOR SWITCHING FLOW RATE FOR ATTACHMENT

[75] Inventors: Hiroshi Imai, Kyoto, Japan; Daigiro Ito, Hixon, Tenn.

[73] Assignee: Kabushiki Kaisha Komatsu Seisakusho, Tokyo, Japan

[21] Appl. No.: 915,833

[22] PCT Filed: Jan. 18, 1991

[86] PCT No.: PCT/JP91/00047

§ 371 Date: Jul. 17, 1992

§ 102(e) Date: Jul. 17, 1992

[87] PCT Pub. No.: WO91/10785

PCT Pub. Date: Jul. 25, 1991

[30] Foreign Application Priority Data

Jan. 18, 1990 [JP] Japan .................................... 2-9763

[51] Int. Cl.[5] .............................................. F16D 31/02

[52] U.S. Cl. ....................................... 60/426; 60/452; 91/446; 91/518

[58] Field of Search ................. 60/420, 426, 428, 429, 60/452; 91/445, 446, 518, 514, 461, 459, 428; 251/295, 285

[56] References Cited

U.S. PATENT DOCUMENTS

| | | | |
|---|---|---|---|
| 2,966,328 | 12/1960 | Burnworth | 251/295 |
| 3,005,562 | 10/1961 | Shaffer | 60/421 |
| 4,193,263 | 3/1980 | Ille | 60/459 X |
| 4,729,222 | 3/1988 | Tanaka et al. | 91/461 X |
| 4,856,278 | 8/1989 | Widmann et al. | 60/452 X |
| 5,005,466 | 4/1991 | Miyaoka | 91/461 X |
| 5,067,389 | 11/1991 | Germain | 91/446 |
| 5,168,705 | 12/1992 | Hirata et al. | 60/452 |
| 5,186,000 | 2/1993 | Hirata et al. | 91/447 |

FOREIGN PATENT DOCUMENTS

| | | |
|---|---|---|
| 53-36567 | 9/1978 | Japan . |
| 58-13202 | 1/1983 | Japan . |
| 62-25524 | 6/1987 | Japan . |

*Primary Examiner*—Edward K. Look
*Assistant Examiner*—Hoang Nguyen
*Attorney, Agent, or Firm*—Richards, Medlock & Andrews

[57] ABSTRACT

The flow rate of oil under pressure for operating an attachment for a hydraulic excavator or the like according to the type of attachment is controlled by a simple hydraulic circuit, capable of easily switching the flow rate and also capable of finely adjusting the flow rate. The circuit has directional control valves (2–4, 6–8), pressure compensating valves (17, 18) disposed at outlet ports of each of the directional control valves, load sensing valves (23, 24) for controlling discharges from the variable capacity type main hydraulic pumps (1, 5), and circuits (21, 22) for feeding back the maximum valve of load pressure between each actuator and the associated direction control valve to the pressure compensating valves and the load sensing valves via a shuttle valve (20). A directional control valve (4), which controls the attachment, has a restricting element for restricting an opening area of a spool of the directional control valve.

16 Claims, 4 Drawing Sheets

APPARATUS FOR SWITCHING FLOW RATE FOR ATTACHMENT

TECHNICAL FIELD

The present invention relates to an apparatus for switching the flow rate for attachments, and, more particularly, to an apparatus for switching the flow rate for attachments in order to supply hydraulic pressure for operating an attachment fastened to a hydraulic excavator according to the type of the attachment.

BACKGROUND ART

A hydraulic excavator composed of an upper revolving structure and a lower travelling structure has a multiplicity of hydraulic actuators such as hydraulic cylinders for moving a boom, an arm, a bucket and the like which constitute a working machine, and a travelling motor for rotating the right and the left tracks. In order to freely operate each of the actuators, two variable capacity type hydraulic pumps are usually mounted. As an alternative to the bucket fastened to serve as a working machine, an attachment such as a crasher or a hydraulic breaker or the like is sometimes fastened so as to perform an operation for crashing a structure or a rock. The aforesaid attachments respectively require different flow rates because the hydraulic devices for operating the attachments are different from one another. For example, a flow rate realized by two pumps is required in a case where a crasher is operated, while only a flow rate realized by one pump is required in a case where a hydraulic breaker is operated.

On the other hand, the above-mentioned attachments are usually used in such a manner that exchange of attachments for use in one hydraulic excavator is performed when the need arises. Therefore, the hydraulic excavator must be capable of easily switching the flow rate to be supplied to the attachment in order to be immediately adapted to the newly fastened attachment. Accordingly, in the conventional hydraulic excavator, a service valve 43 of two provided service valves 40 and 43 is, as shown in FIG. 6, switched so as to switch the flow rate between that realized by one main pump and that realized by two main pumps.

Referring to FIG. 6, five directional control valves for operating a revolving actuator, a boom-Hi actuator, a left-side service actuator, an arm-Lo actuator, and a left running actuator are connected in parallel to a variable capacity type hydraulic pump (hereinafter called a "main pump") 1. Five directional control valves for operating a right running actuator, a bucket actuator, a boom-Lo actuator, an arm-Hi actuator, and a right-side service actuator are connected in parallel to a main pump 5. Two pipes 41 and 42 connected to outlet ports of the right side service valve 40 are respectively connected to a hydraulic circuit extending from the left side service valve 43 to an actuator 19 so that they are joined together.

An attachment pedal 13 for operating the attachment is positioned in contact with a pilot-pressure control valve (hereinafter called a "PPC valve") 14, and a control pump 12 serves as a hydraulic pressure source for it. Two pilot circuits 44 and 45 extending from the PPC valve 14 are respectively connected to the left end portion and the right end portion of the service valve 43. Furthermore, branch circuits 46 and 47 are respectively provided for the two pilot circuits 44 and 45 and are respectively connected to the right end portion and the left end portion of the service valve 40 via pilot circuit directional control valves 48 and 49 having solenoids. The solenoids of the aforesaid pilot circuit direction control valves 48 and 49 are respectively connected to a selection switch 50.

In a case where, for example, a crasher is fastened as the attachment, a flow rate realized by two pumps is required in order to operate the crasher and therefore the selection switch 50 is switched on. As a result, the solenoids of the pilot circuit directional control valves 48 and 49 are excited, the branch circuits 46 and 47 of the pilot circuits 44 and 45 are thereby communicated, and the pilot pressure acts on the left end portion of the service valve 43 and the right end portion of the service valve 40 or acts on the right end portion of the service valve 43 and the left end portion of the service valve 40 by the operation of the attachment pedal 13. Thus, the total flow rate of the main pumps 1 and 5 acts on the actuator 19 which operates the attachment.

In a case where a hydraulic breaker is fastened as the attachment, only a flow rate realized by one main pump is required to operate the hydraulic breaker. Therefore, the selection switch 50 is switched off. As a result, the solenoids of the pilot circuit directional control valves 48 and 49 are demagnetized and thereby the branch circuits 46 and 47 of the pilot circuits 44 and 45 are closed. Thus, the pilot pressure acts on only the left end portion or the right end portion of the service valve 43 by the operation of the attachment pedal 13. As a result, the flow rate of the main pump 1 solely acts on the actuator which operates the attachment.

In order to control the discharge from the main pump according to the operation of each spool for the directional control valve, and more particularly, to control the discharge from the main pump to become minimum when each directional control valve is at the neutral position for the purpose of reducing wasteful flow, a relief valve 51 and an orifice 52 are provided for the main circuit in such a manner that they are connected to a flow-rate adjustment mechanism 53 of the main pump via circuits so that the discharge from the main pump is controlled.

However, the flow-rate switching circuit thus structured involves the following problems: (1) The two pilot circuit directional control valves 48 and 49 must be provided for the pilot circuit, and the two pipes 41 and 42 for realizing joining from the service valve 40 to the main circuit of the attachment actuator 19 must be provided. This leads to a fact that the hydraulic circuit becomes too complicated, causing the reliability of the hydraulic excavator to deteriorate. Furthermore, the number of the inspection processes undesirably increases and the manufacturing cost increases. (2) Since the quantity of oil to be supplied to the attachment actuator is switched in two stages, that is the quantity realized by the one pump and that realized by the two pumps, a fine adjustment of the flow rate cannot be performed.

Accordingly, an object of the present invention is to provide an apparatus for switching the flow rate for attachments having a simple hydraulic circuit, capable of switching a required flow rate for each attachment by a simple operation and also capable of finely adjusting the flow rate.

SUMMARY OF THE INVENTION

An apparatus for switching flow rate for attachments according to the present invention comprises a hydraulic circuit having a plurality of directional control valves connected in parallel to variable capacity type hydraulic pumps and a plurality of actuators respectively controlled by the directional control valves, the hydraulic circuit incorporating pressure compensating valves disposed at outlet ports of each of the directional control valves, load sensing valves for controlling discharges from the variable capacity type hydraulic pumps, and circuits for feeding back the maximum value $P_L$ of load pressure between each actuator and the associated directional control valve to the pressure compensating valves and the load sensing valves via a shuttle valve. The flow rate of each of the variable capacity type hydraulic circuit pumps is controlled by the load sensing valves so as to make constant the difference between discharge pressure $P_P$ of the variable capacity type hydraulic pump and the maximum value $P_L$ of the load pressure. The directional control valve which controls the attachment has restricting means for restricting an opening area of a spool thereof.

The restricting means can be composed of an attachment pedal, a pilot pressure control valve positioned in contact with a disc disposed at the lower end portion of the pedal and acting to control the attachment directional control valve, and a pedal stopper disposed in front of the pedal and capable of restricting the quantity of the operation thereof. As an alternative to this, it can be composed of an electrical operation lever, solenoids disposed at the two end portions of the attachment directional control valve, and a controller for exciting either of the solenoids by means of an electrical signal which corresponds to the operation quantity of the electrical operation lever. As an alternative to this, it can be composed of a position stopper disposed at an end portion of the attachment directional control valve and a direct-pulling lever disposed at an opposite end portion and acting to restrict the opening area of the spool according to the quantity of the stroke thereof.

According to the above-mentioned structure, assuming that the flow rate to be supplied to the attachment, that is the flow rate of the main pump: $Q_P$, the spool opening area: A, the main pump discharge: $P_P$, and the maximum load pressure value between each actuator and the associated directional control valve: $P_L$, the following relationship is obtained:

$$Q_P = C \times A \times \sqrt{(P_P - P_L)}$$

where C is a constant.

The main pump flow rate $Q_P$ is controlled so as to make $P_P - P_L$ = constant, and the quantity of oil to be supplied to the actuator is controlled according to the area of the opening of the spool of the directional control valve.

Furthermore, by virtue of the restricting means, switching of the flow rate corresponding to the conventional switch between one pump and two pumps can be easily performed and the flow rate to be supplied to the attachment can be finely adjusted.

BRIEF DESCRIPTION OF DRAWINGS

FIGS. 2 and 3 illustrate the operation range of the attachment pedal shown in FIG. 1, in which FIG. 2 illustrates a case where a pedal stopper is raised, and FIG. 3 illustrates a case where the pedal stopper is pushed down;

FIGS. 4 and 5 are partial hydraulic circuit diagrams which schematically illustrate the structure of second and third embodiments, in which FIG. 4 illustrates a case where an electrical lever is used for operating the attachment, and FIG. 5 illustrates a case where a direct pulling lever is used for operating the attachment.

BEST MODE FOR CARRYING OUT THE INVENTION

Embodiments of an apparatus for switching the flow rate for attachments according to the present invention will now be described with reference to the drawings.

Figure 1:
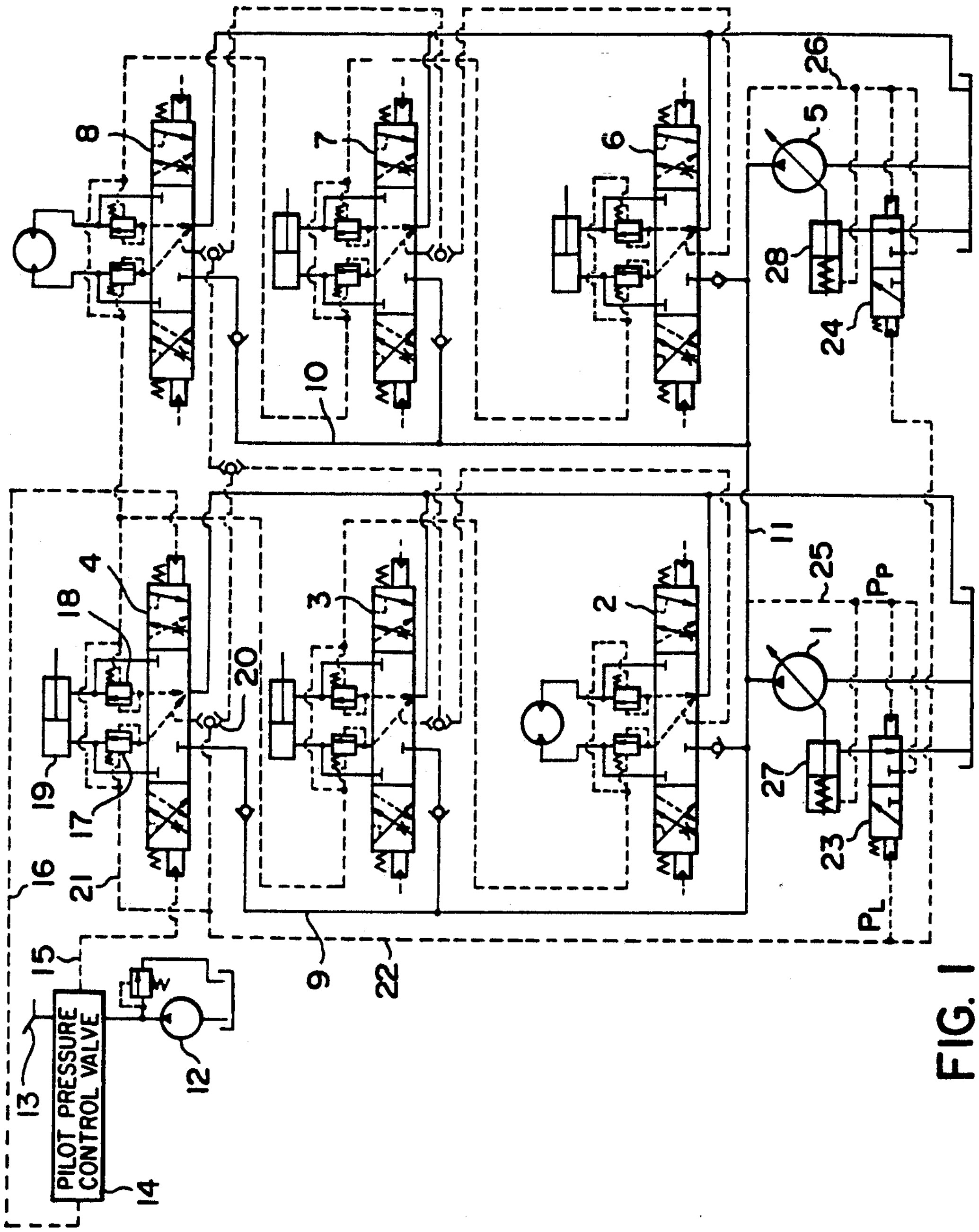
FIG. 1 schematically illustrates a hydraulic circuit for use in a first embodiment of an apparatus for switching the flow rate for attachments according to the present invention.

FIG. 1 is a hydraulic circuit diagram which schematically illustrates a first embodiment of the present invention applied to a hydraulic excavator. Directional control valves 2, 3 and 4 for operating corresponding actuators are respectively connected in parallel to a main pump 1. Directional control valves 6, 7 and 8 for operating corresponding actuators are respectively connected in parallel to a main pump 5 similarly to the above description. Although three directional control valves are provided for one main pump in FIG. 1 for the purpose of simplifying the description, four or five directional control valves are actually provided for the purpose of operating the working machine and the right and the left running hydraulic motors.

The directional control valve 4 controls the attachment and has a spool through which the total flow rate of the main pumps 1 and 5 is able to pass. A main circuit 9 of the main pump 1 and a main circuit 10 of the main pump 5 are joined together by a joining circuit 11. Furthermore, pilot circuits 15 and 16 extend from a control pump 12 to reach the two end portions of the directional control valve 4 via a PPC valve 14 which is operated by an attachment pedal 13.

Each of the directional control valves is a seven-port three-position directional control valve, and the downstream side of each of the directional control valves is connected to an actuator 19 and the like via pressure compensating valves 17 and 18. Furthermore, a shuttle valve 20, for subjecting a comparison between the load of the actuator 19 and the like and the load of the other actuators and is operated depending upon the result, is disposed in a desired portion. Thus, a circuit 21 which has passed through the shuttle valve 20 is connected to the pressure compensating valves 17 and 18 of the directional control valve 4 as well as connected so as to sequentially act on all of the other pressure control valves. A circuit 22 which has passed through the shuttle valve 20 and branched from the circuit 21 is connected to one end of each of load sensing valves 23 and 24 which respectively control the discharges from the main pumps 1 and 5, the aforesaid end having a spring. Furthermore, branch circuits 25 and 26 of the main circuits 9 and 10 are respectively connected to the other end portions of the load sensing valves 23 and 24. The branch circuits 25 and 26 are connected to the load sensing valves 23, 24, and servo cylinders 27 and 28.

Figure 2:
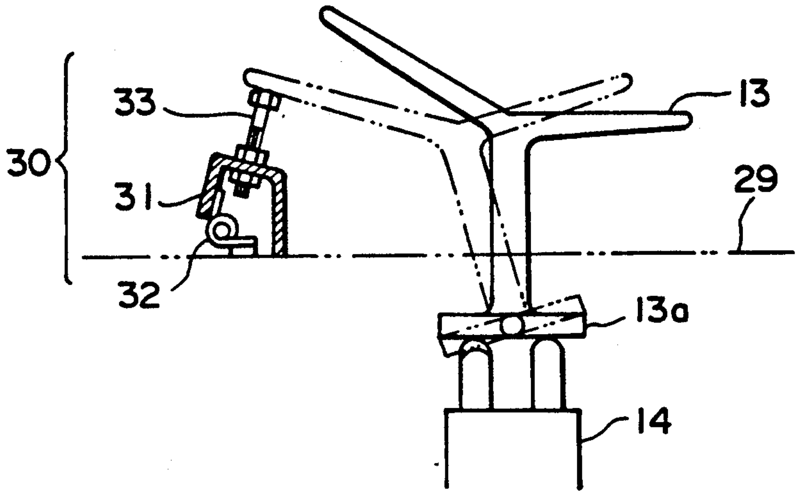

FIG. 2 schematically illustrates the attachment pedal portion. Referring to FIG. 2, the attachment pedal 13 projects over a floor 29 in front of a driver's seat. The attachment PPC valve 14, disposed below the floor 29, is positioned in contact with a disc 13*a* disposed at the lower end portion of the attachment pedal 13. In addition, a pedal stopper 30 is disposed in front of the aforesaid attachment pedal 13. The pedal stopper 30 is simply structured in such a manner that an end portion of its frame 31 formed into a substantially U-shape facing side is secured to the floor 29 via a hinge 32. A bolt 33 for finely adjusting the pedal stroke is fastened to the frame 31.

When the attachment pedal 13 is operated from its neutral position, the leading portion of the pedal comes in contact with the bolt 33 as designated by dotted line so that a further operation of the pedal is inhibited. The aforesaid position is a half position which defines a pedal operation quantity which corresponds to the conventional discharge from the one pump.

When the frame 31 of the pedal stopper 30 is inclined forwardly while making the hinge 32 to be the center of tilting, the attachment pedal 13 can be operated to the stroke end. The aforesaid position is a full position which corresponds to the conventional discharge from the two pumps. As described above, the pump can be easily switched.

The function of the hydraulic circuit when the attachment is being used will now be described.

Figure 3:
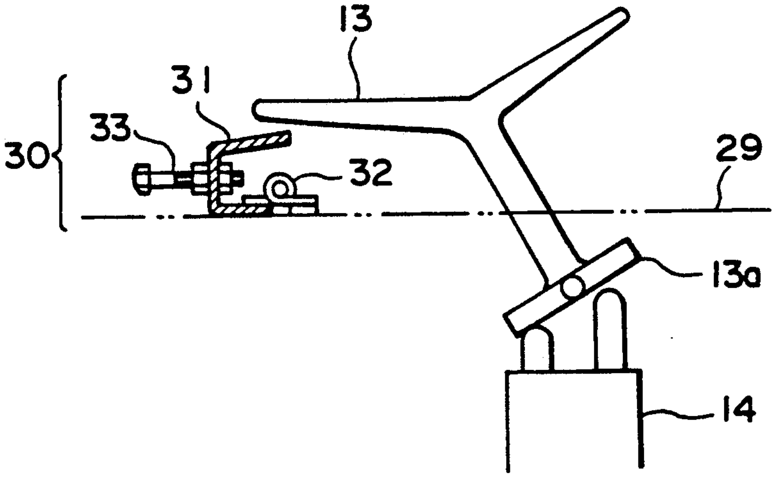

In a case where, for example, a crasher is fastened as the working machine attachment for the hydraulic excavator, the pedal stopper 30 is inclined forwardly as shown in FIG. 3 so as to permit full operation of the attachment. According to the operation quantity of the attachment pedal 13, the pilot pressure acts on the right end portion or the left end portion of the directional control valve 4 so as to control the spool opening area of the directional control valve 4. Oil under pressure supplied from the main pump 1 passes through the main circuit 9, while oil under pressure supplied from the main pump 5 passes through the joining circuit 11. As a result, they are joined together before the joined oil is sent to the actuator 19 via the directional control valve 4. The load acting on the actuator 19 at this time acts on the pressure compensating valve 17 or 18 via the shuttle valve 20 and the circuit 21. Furthermore, as pressure $P_L$, it acts on an end portion of each of the load sensing valves 23 and 24 via the circuit 22.

On the other hand, the discharge pressures from the main pumps 1 and 5 act on the other end portions of the load sensing valves 23 and 24 as pressure $P_P$. If a subject to be crashed is hard, $P_L$ becomes enlarged and $P_L$+spring tension acting on the end portions of the load sensing valves 23 and 24 becomes larger than $P_P$, causing the load sensing valves 23 and 24 to be switched. As a result, the oil under pressure is introduced into the right side portions of the servo cylinders 27 and 28, causing the swash plate angles of the main pumps 1 and 5 to be changed. Therefore, the discharges from the main pumps I and 5 are enlarged. If the subject to be crashed is not so hard, $P_L$+spring tension contrarily becomes smaller than $P_P$ because $P_L$ is small. Therefore, the swash plate angle is altered so as to reduce the discharges from the main pumps 1 and 5.

In a case where, for example, a breaker is fastened as the attachment for the working machine, the frame 31 of the pedal stopper 30 is raised rearwardly as shown in FIG. 2 and the attachment is operated. Even if the attachment pedal 13 is fully operated, the pedal stroke is stopped at the half position and the total discharge from the main pumps 1 and 5 is substantially equal to the maximum discharge from one pump.

The pedal operation quantity can be finely adjusted by means of the bolt 33 according to the type of the attachment for the working machine.

Figure 4:
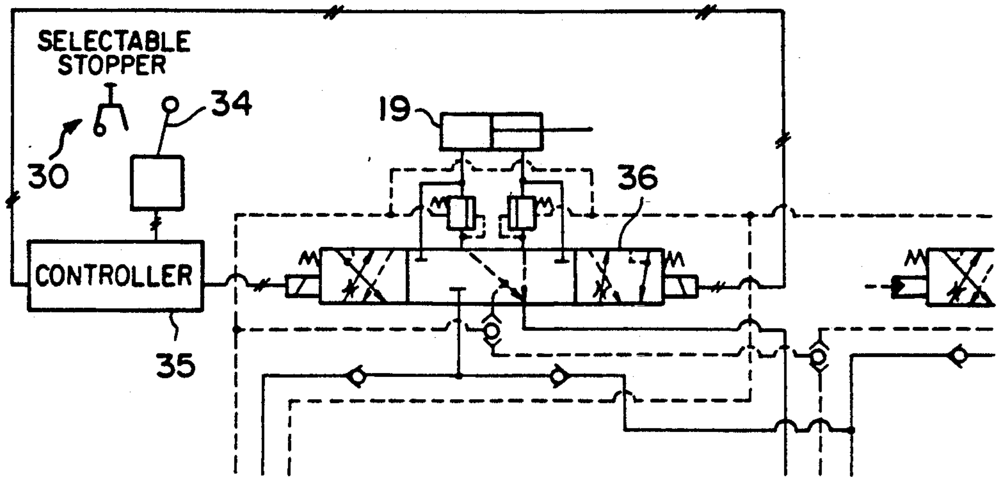

FIG. 4 is a partial hydraulic circuit diagram which schematically illustrates a second embodiment of the present invention. The operation of the attachment is performed with an electrical lever 34 in place of the attachment pedal 13.

A signal transmitted according to the operation stroke of the electrical lever 34 is supplied to a controller 35. According to this, an electric current transmitted from the controller 35 excites either of the solenoids disposed at the two end portions of the directional control valve 36 which operates the attachment. The internal structure of the aforesaid directional control valve 36 is the same as that according to the first embodiment and the restriction of the spool opening area is performed by restricting the quantity of the stroke of the electrical lever by means of a stopper 30.

Figure 5:
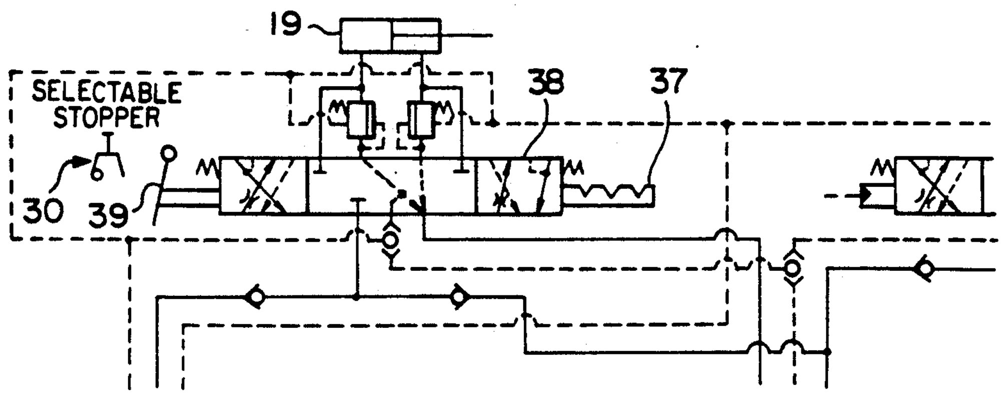
Figure 6:
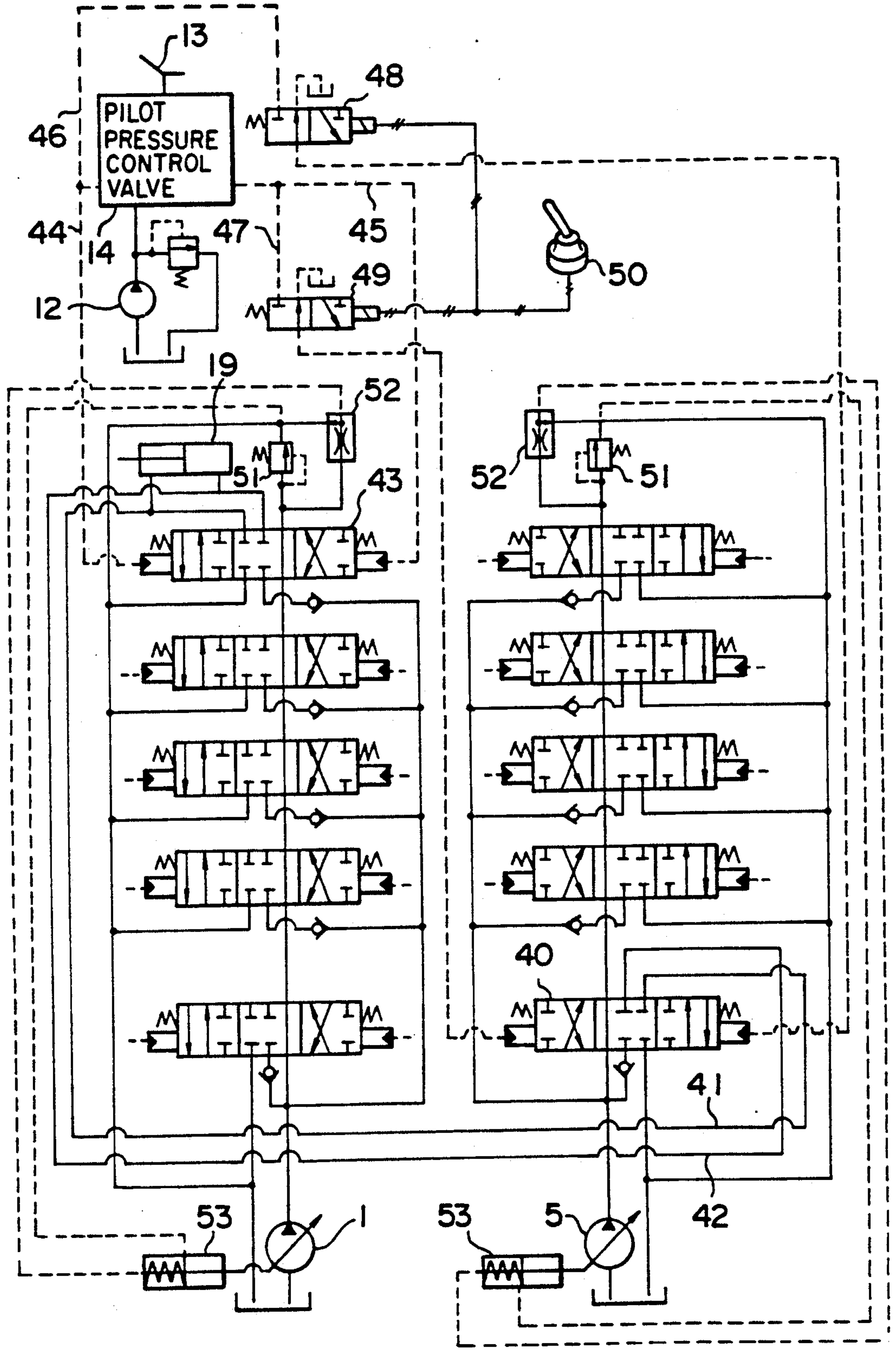
FIG. 6 (PRIOR ART)
FIG. 6 schematically illustrates a hydraulic circuit for use in a conventional apparatus for switching flow rate for attachments.

FIG. 5 is a partial hydraulic circuit diagram which schematically illustrates a third embodiment of the present invention. The attachment is operated by operating an attachment operating directional control valve 38 having a position stopper 37 by a direct-pulling lever 39. The internal structure of the directional control valve 38 is the same as that according to the first embodiment. The spool opening area is changed in proportion to the quantity of the stroke of the direct-pulling lever 39 and becomes maximum when the spool is fixed by the position stopper 37. The required flow rate, which is different depending upon the type of the attachment, is controlled by restricting the quantity of the stroke of the direct-pulling lever 39 by a stopper 30.

In each of the above-mentioned embodiments, the maximum value of the load pressure between each actuator and each directional control valve is selected by the shuttle valve and the selected maximum valve is made to be PL which is caused to act on the load sensing valve. Therefore, if the load of an actuator except for the actuator which is operating the attachment becomes maximum, the flow rate of the main pump which corresponds to the aforesaid load is supplied to the subject actuator. As a result, a hydraulic circuit in which all of the actuators including the attachment actuator can be freely operated can be constituted. Although the description is made about the 2-pump system having two capacity variable type hydraulic pumps, the present invention is not limited to this and it can be embodied in a large-capacity 1-pump system.

As described, the following effects can be obtained:

(1) The pilot circuit directional control valve disposed in the conventional pilot circuit can be omitted from the structure and only one service valve is sufficient to enable the desired effect to be obtained. Therefore, the structure of the hydraulic circuit can be simplified. As a result, the reliability of the hydraulic circuit can be improved, and the required number of inspection processes and the manufacturing cost can be reduced.

(2) The flow rate switch to be performed when the attachment is exchanged can be significantly easily performed by fastening a simple restricting means such as a pedal stopper.

(3) The flow rate can be finely adjusted according to the spool opening area of the directional control valve and therefore a flow rate suitable for each attachment can be selected.

(4) The load pressure acting between the actuator and each directional control valve is fed back to the main pump and a flow rate corresponding to the load pressure is always supplied to the actuator. Therefore, a wasteful flow rate can be reduced and the running cost can be reduced.

INDUSTRIAL APPLICABILITY

The present invention is advantageous as an apparatus for selecting the flow rate for a newly mounted attachment structured by a simple hydraulic circuit, capable of switching the required flow rate for each attachment by a simple operation and also capable of finely adjusting the flow rate.

What is claimed is:

1. An apparatus for switching flow rate for exchangeable attachments requiring different flow rates, comprising a hydraulic circuit having a plurality of directional control valves connected in parallel to variable capacity type hydraulic pumps, and a plurality of actuators respectively controlled by said directional control valves, one of said directional control valves being an attachment directional control valve for controlling one of said exchangeable attachments, said hydraulic circuit incorporating pressure compensating valves disposed at outlet ports of each of said directional control valves, load sensing valves for controlling discharges from said variable capacity type hydraulic pumps, and circuits for feeding back the maximum value $P_L$ of load pressure between each actuator and the associated directional control valve via a shuttle valve to each of said pressure compensating valves to vary the flow rate to the respective actuator and to said load sensing valves to control the flow rate of each of said variable capacity type hydraulic pumps by said load sensing valves so as to make constant the difference between discharge pressure $P_P$ of said variable capacity type hydraulic pumps and said maximum value $P_L$ of said load pressure, and restricting means for restricting an opening area of a spool of said attachment directional control valve, wherein said restricting means comprises an actuatable attachment control lever movable through a stroke, and means for selectively restricting the quantity of said stroke of said actuatable attachment control lever.

2. An apparatus for switching flow rate for attachments, comprising a hydraulic circuit having a plurality of directional control valves connected in parallel to variable capacity type hydraulic pumps, and a plurality of actuators respectively controlled by said directional control valves, one of said directional control valves being an attachment directional control valve for controlling an attachment, said hydraulic circuit incorporating pressure compensating valves disposed at outlet ports of each of said directional control valves, load sensing valves for controlling discharges from said variable capacity type hydraulic pumps, and circuits for feeding back the maximum value $P_L$ of load pressure between each actuator and the associated directional control valve to said pressure compensating valves and said load sensing valves via a shuttle valve, wherein the flow rate of each of said variable capacity type hydraulic pumps is controlled by said load sensing valves so as to make constant the difference between discharge pressure $P_P$ of said variable capacity type hydraulic pumps and said maximum value $P_L$ of said load pressure, and said attachment directional control valve having restricting means for restricting an opening area of a spool thereof, wherein said restricting means is composed of an attachment pedal, a pilot pressure control valve positioned in contact with a disc disposed at the lower end portion of said pedal and acting to control said attachment directional control valve and a pedal stopper disposed in front of said pedal.

3. An apparatus for switching flow rate for exchangeable attachments according to claim 1, wherein said actuatable attachment control lever is composed of an electrical operation lever movable through a stroke, solenoids disposed at the two end portions of said attachment directional control valve, and a controller for exciting either of said solenoids by means of an electrical signal which corresponds to the operation quantity of the stroke of said electrical operation lever.

4. An apparatus for switching flow rate for exchangeable attachments according to claim 1, wherein said actuatable attachment control lever is composed of a position stopper disposed at an end portion of said attachment directional control valve, and a direct pulling lever disposed at an opposite end portion of said attachment directional control valve and acting to restrict said opening area of said spool according to the quantity of the stroke of said direct pulling lever.

5. Apparatus for switching flow rate for exchangeable attachments requiring different flow rates, said apparatus comprising:

at least one variable capacity type hydraulic pump for providing hydraulic fluid at pump discharge pressure, each said at least one variable capacity type hydraulic pump having a capacity control element;

a plurality of hydraulic actuators, wherein one of said plurality of hydraulic actuators is an attachment actuator for operating one of said exchangeable attachments;

a plurality of directional control valves connected in parallel with said at least one variable capacity type hydraulic pump, each of said directional control valves being associated with a respective one of said plurality of hydraulic actuators, with each directional control valve having a conduit connected between a port of the respective directional control valve and the associated hydraulic actuator to provide for passage of hydraulic fluid between the respective directional control valve and the associated hydraulic actuator, wherein the directional control valve associated with said attachment actuator is an attachment directional control valve;

a circuit for determining the maximum value of load pressure between a directional control valve and the associated hydraulic actuator and for controlling the capacity control element of each said at least one variable capacity type hydraulic pump so as to maintain the difference between said pump discharge pressure and said maximum value at least substantially constant;

an attachment control lever;

means for controlling said attachment directional control valve responsive to the operation of said attachment control lever; and means for selectively restricting the operation of said attachment control lever.

6. Apparatus in accordance with claim 5 wherein said means for selectively restricting the operation of said attachment control lever has a first position permitting a limited range of operation of said attachment directional control valve and a second position permitting a greater range of operation of said attachment directional control valve.

7. Apparatus in accordance with claim 6 wherein said attachment directional control valve is a hydraulically actuatable valve, wherein said means for controlling the attachment directional control valve responsive to the operation of said attachment control lever comprises a pilot pressure control valve associated with said attachment control lever and connected to said hydraulically actuatable valve to thereby control said hydraulically actuatable valve.

8. Apparatus in accordance with claim 7 wherein said means for selectively restricting the operation of said attachment control lever comprises a stopper associated with said attachment control lever for selectively limiting the range of movement of said attachment control lever.

9. Apparatus in accordance with claim 6 wherein said attachment directional control valve is a solenoid actuatable valve, wherein said means for controlling the attachment directional control valve responsive to the operation of said attachment control lever comprises a controller associated with said attachment control lever for providing an electrical signal to said solenoid actuatable valve responsive to the position of said attachment control lever to thereby control said solenoid actuatable valve.

10. Apparatus in accordance with claim 6 wherein said attachment control lever is connected to said attachment directional control valve for directly actuating said attachment directional control valve, and wherein said means for selectively restricting the operation of said attachment control lever comprises a stopper associated with said attachment directional control valve for selectively limiting the range of movement of said attachment directional control valve.

11. Apparatus in accordance with claim 5 wherein said at least one variable capacity type hydraulic pump comprises at least a first variable capacity type hydraulic pump and a second variable capacity type hydraulic pump connected in parallel for providing hydraulic fluid at pump discharge pressure, said first variable capacity type hydraulic pump has a first capacity control element, said second variable capacity type hydraulic pump has a second capacity control element, and said circuit controls said first and second capacity control elements so as to maintain the difference between said pump discharge pressure and said maximum value at least substantially constant.

12. Apparatus in accordance with claim 5 wherein each hydraulic actuator has first and second ports, wherein each directional control valve has first and second ports, wherein each directional control valve has the first mentioned conduit connected between the first port of the respective directional control valve and the first port of the associated hydraulic actuator and a second conduit connected between the second port of the respective directional control valve and the second port of the associated hydraulic actuator, wherein each first mentioned conduit has a first pressure compensating valve connected therein to adjust the flow rate from the at least one variable capacity type hydraulic pump to the associated hydraulic actuator responsive to said maximum value and to the load pressure between the respective directional control valve and the associated hydraulic actuator in the first mentioned conduit, and wherein each second conduit has a second pressure compensating valve connected therein to adjust the flow rate from the at least one variable capacity type hydraulic pump to the associated hydraulic actuator responsive to said maximum value and to the load pressure between the respective directional control valve and the associated hydraulic actuator in the second conduit.

13. Apparatus in accordance with claim 12 wherein said circuit comprises a plurality of shuttle valves connected to said directional control valves and to each other so as to provide the maximum value of load pressure between a directional control valve and the associated hydraulic actuator.

14. Apparatus in accordance with claim 13 wherein said circuit further comprises at least one spring biased load sensing valve, each load sensing valve being associated with a respective capacity control element and having first and second pilot inputs, means for applying said maximum value to the first pilot input, and means for applying said pump discharge pressure to the second pilot input.

15. Apparatus in accordance with claim 5 wherein said circuit comprises a plurality of shuttle valves connected to said directional control valves and to each other so as to provide the maximum value of load pressure between a directional control valve and the associated hydraulic actuator.

16. Apparatus in accordance with claim 5 wherein said circuit comprises at least one spring biased load sensing valve, each load sensing valve being associated with a respective capacity control element for varying the capacity of the associated variable capacity type hydraulic pump, each load sensing valve having first and second pilot inputs, means for applying said maximum value to the first pilot input, and means for applying said pump discharge pressure to the second pilot input.

* * * * *